US011375137B2

(12) United States Patent
Okuike

(10) Patent No.: US 11,375,137 B2
(45) Date of Patent: Jun. 28, 2022

(54) IMAGE PROCESSOR, IMAGE PROCESSING METHOD, AND IMAGING DEVICE

(71) Applicant: SONY SEMICONDUCTOR SOLUTIONS CORPORATION, Kanagawa (JP)

(72) Inventor: Kazuyuki Okuike, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/768,809

(22) PCT Filed: Oct. 25, 2018

(86) PCT No.: PCT/JP2018/039696
§ 371 (c)(1),
(2) Date: Jun. 1, 2020

(87) PCT Pub. No.: WO2019/116746
PCT Pub. Date: Jun. 20, 2019

(65) Prior Publication Data
US 2021/0176390 A1 Jun. 10, 2021

(30) Foreign Application Priority Data
Dec. 11, 2017 (JP) .............................. JP2017-236879

(51) Int. Cl.
*G06K 9/00* (2022.01)
*H04N 5/235* (2006.01)
(Continued)

(52) U.S. Cl.
CPC ............. *H04N 5/2357* (2013.01); *G06T 7/20* (2013.01); *H04N 5/2351* (2013.01);
(Continued)

(58) Field of Classification Search
CPC ...... H04N 5/2357; H04N 5/2353; H04N 9/77; H04N 9/07; H04N 9/646; H04N 5/2351; G06T 7/20; G06T 2207/10024
See application file for complete search history.

(56) References Cited

U.S. PATENT DOCUMENTS

2009/0015707 A1* 1/2009 Hibino ............... H04N 5/23212
348/E5.037
2010/0026851 A1* 2/2010 Yoneyama ............... H04N 9/77
348/238
(Continued)

FOREIGN PATENT DOCUMENTS

CN         1112330 A    11/1995
JP         07-177427 A    7/1995
(Continued)

OTHER PUBLICATIONS

International Search Report and Written Opinion of PCT Application No. PCT/JP2018/039696, dated Jan. 8, 2019, 10 pages of ISRWO.

*Primary Examiner* — Howard D Brown, Jr.
(74) *Attorney, Agent, or Firm* — Chip Law Group

(57) ABSTRACT

An image processor includes a first correction section that calculates a luminance average value of an image and corrects a luminance of the image on a basis of a periodic change in the luminance average value, and a second correction section that acquires color information on the image and corrects the color information on a basis of a periodic change in the color information. This configuration suppresses a flicker in imaging at a high-speed frame rate.

14 Claims, 16 Drawing Sheets

(51) Int. Cl.
*G06T 7/20* (2017.01)
*H04N 9/07* (2006.01)
*H04N 9/64* (2006.01)
*H04N 9/77* (2006.01)

(52) U.S. Cl.
CPC ............ *H04N 5/2353* (2013.01); *H04N 9/07* (2013.01); *H04N 9/646* (2013.01); *H04N 9/77* (2013.01); *G06T 2207/10024* (2013.01)

(56) References Cited

U.S. PATENT DOCUMENTS

| | | | |
|---|---|---|---|
| 2010/0027072 A1* | 2/2010 | Enjuji | G06T 7/90 |
| | | | 358/3.01 |
| 2010/0321414 A1* | 12/2010 | Muroi | G09G 3/3413 |
| | | | 345/102 |
| 2010/0329553 A1* | 12/2010 | Shiokawa | H04N 9/77 |
| | | | 382/167 |
| 2015/0286044 A1* | 10/2015 | Rout | G02B 27/0081 |
| | | | 382/163 |
| 2016/0234437 A1* | 8/2016 | Kuwada | H04N 5/23238 |
| 2017/0180683 A1* | 6/2017 | Won | H04N 9/76 |
| 2017/0278282 A1* | 9/2017 | Matsumoto | G06T 5/009 |

FOREIGN PATENT DOCUMENTS

| | | |
|---|---|---|
| JP | 2016-082510 A | 5/2016 |
| JP | 2016-122941 A | 7/2016 |
| JP | 2017-098777 A | 6/2017 |

* cited by examiner

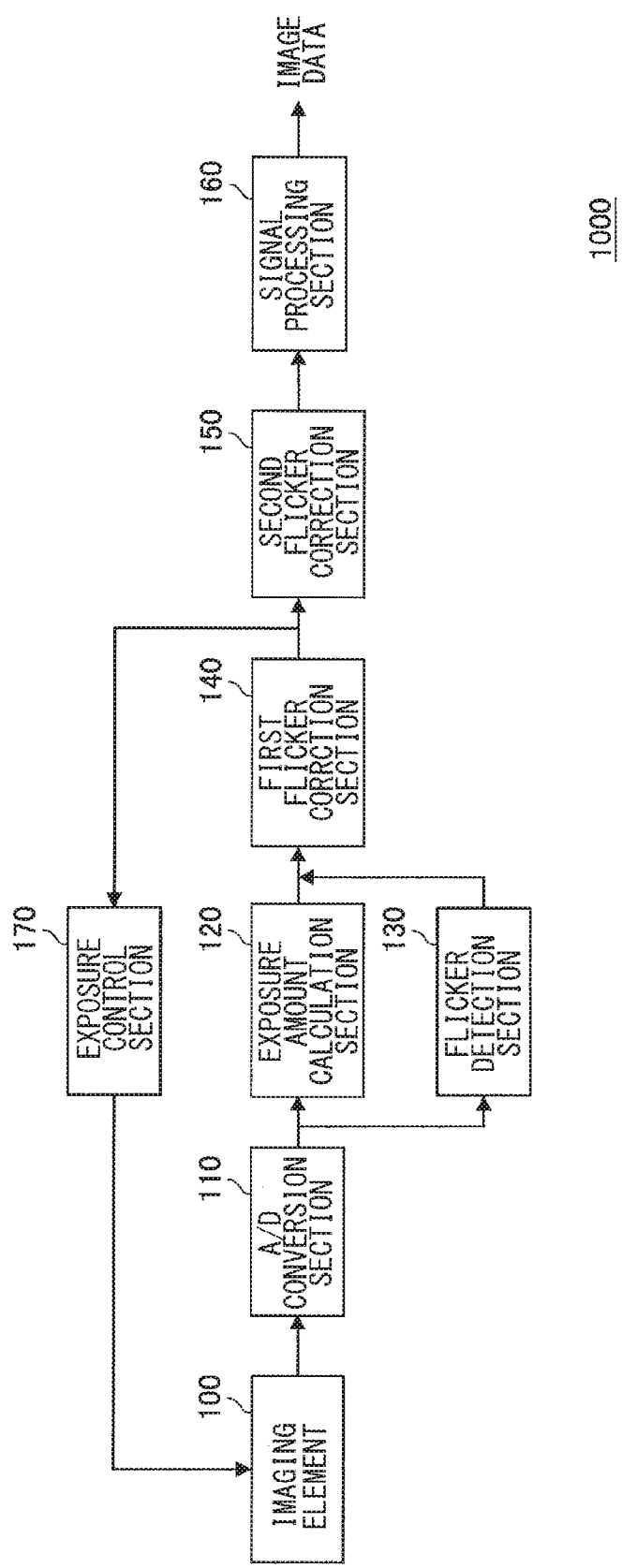
[FIG. 1A]

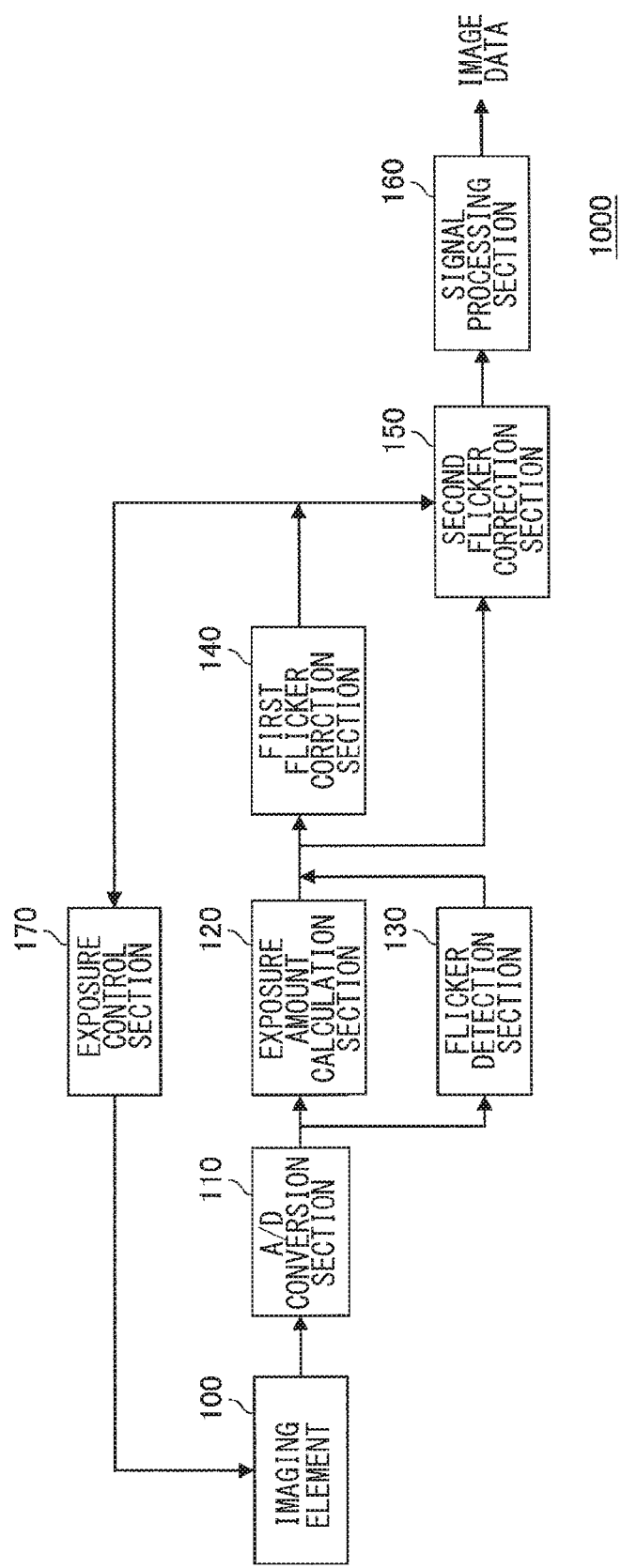
[FIG. 1B]

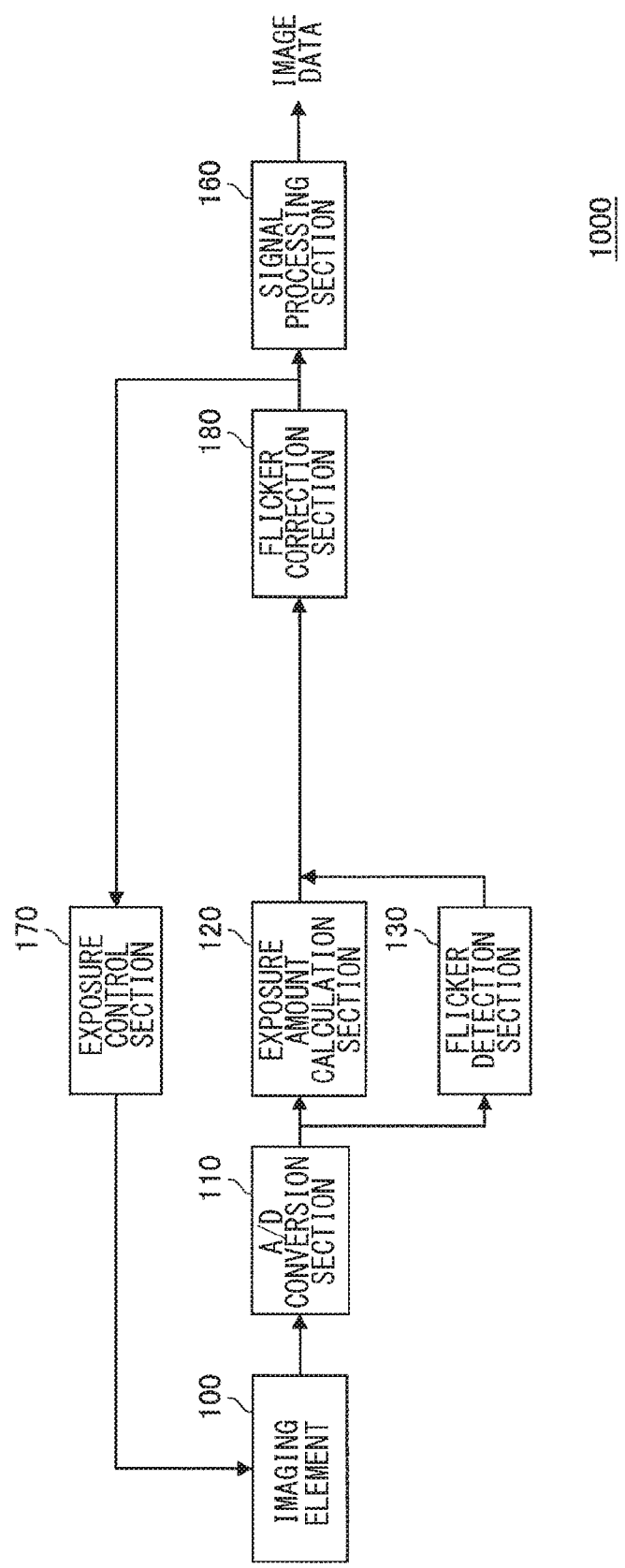
[FIG. 2]

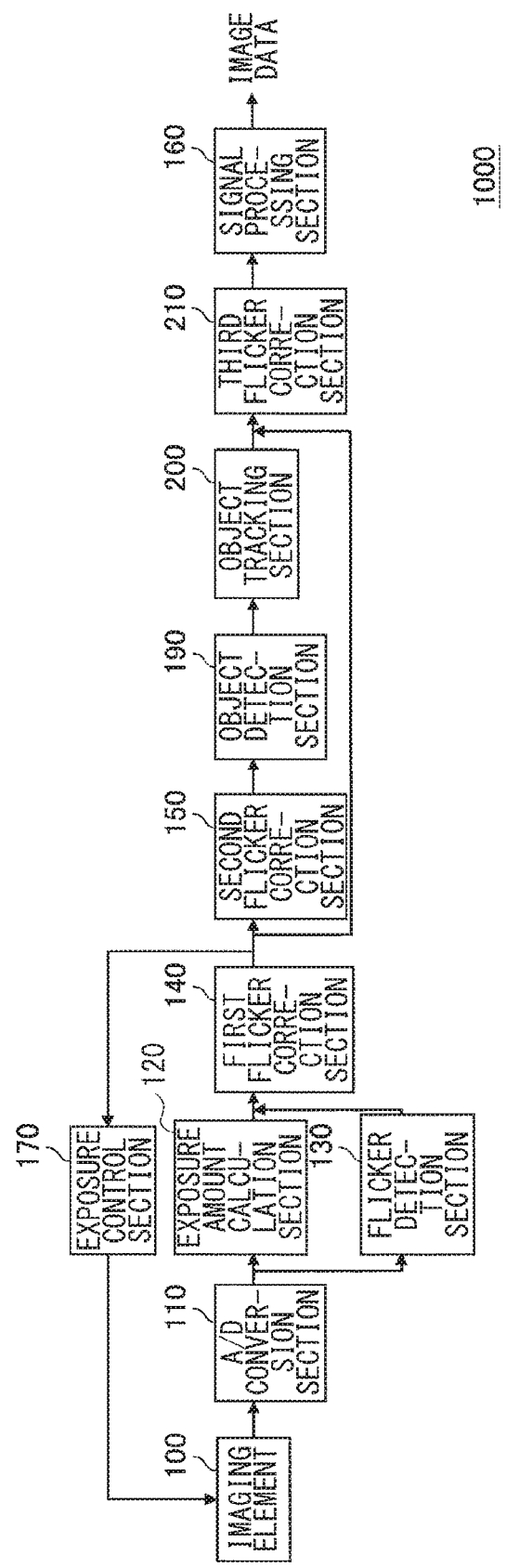
[FIG. 3]

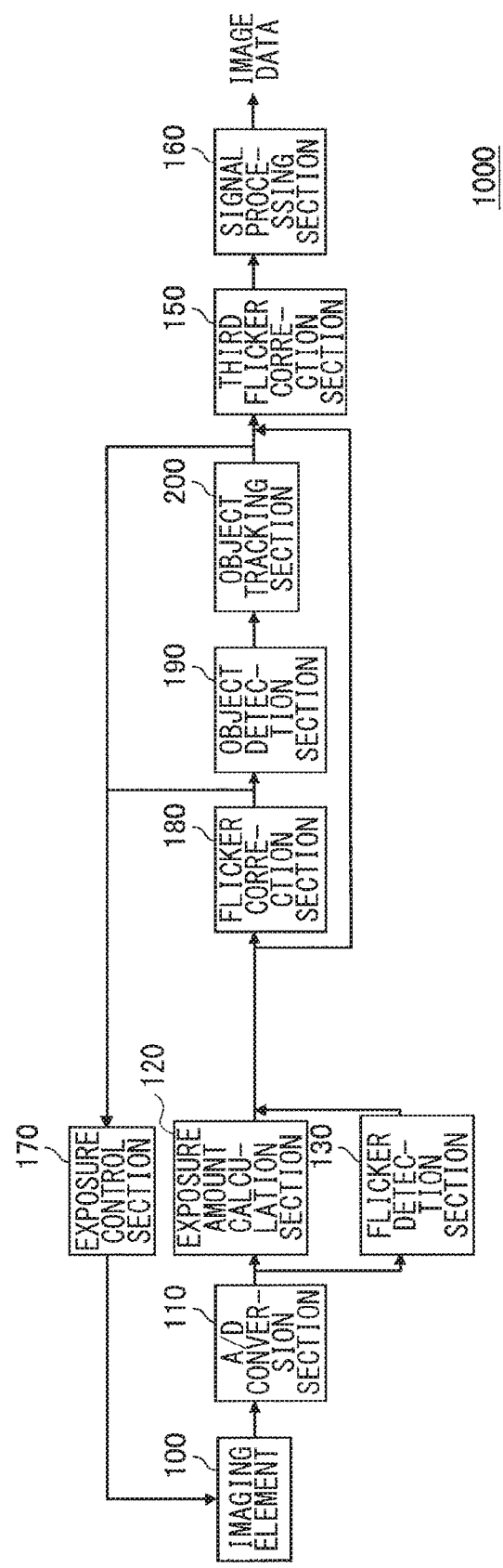
[FIG. 4]

[FIG. 5]
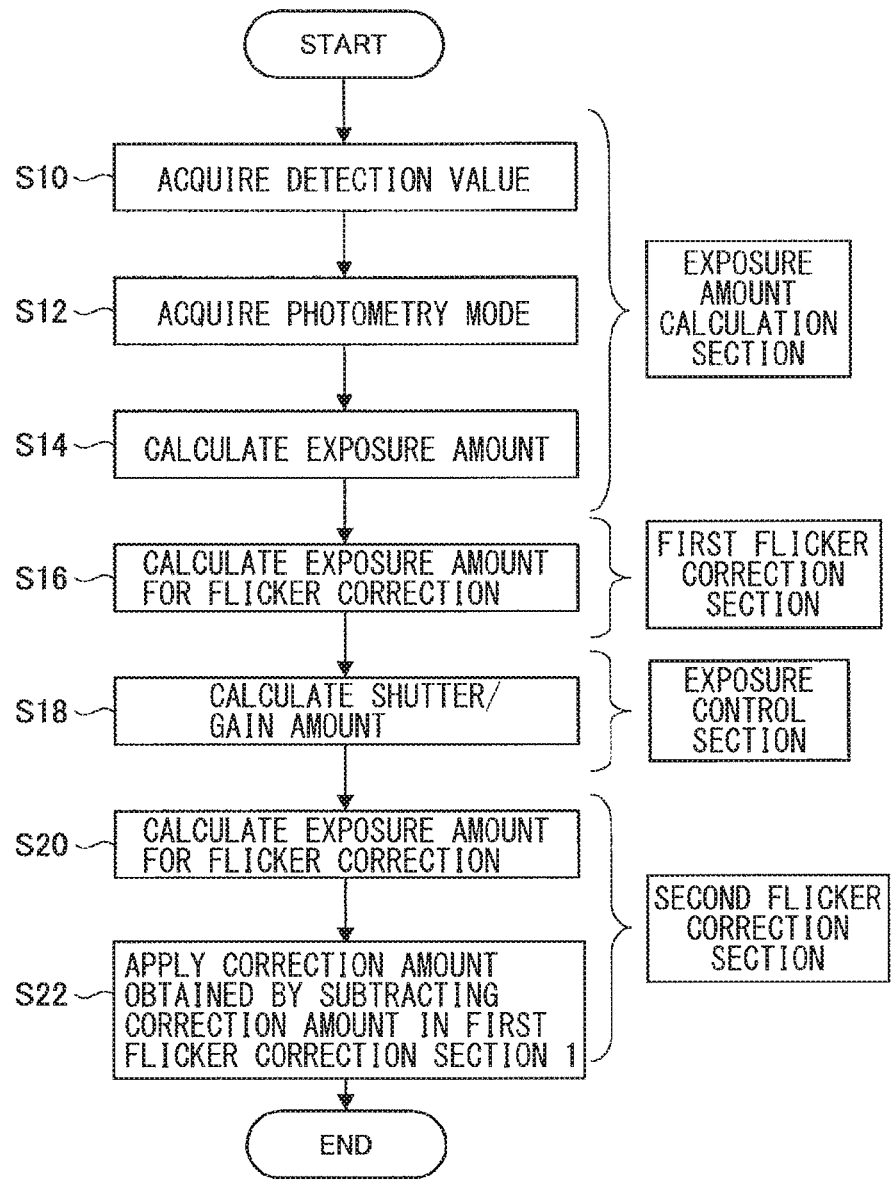

[FIG. 6]
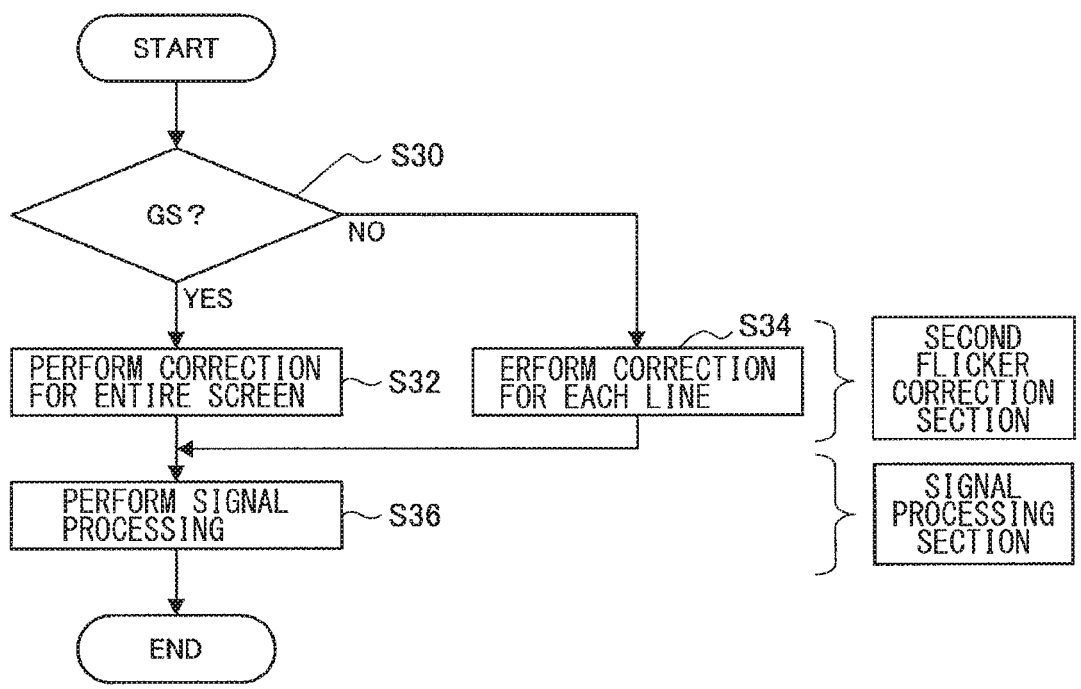

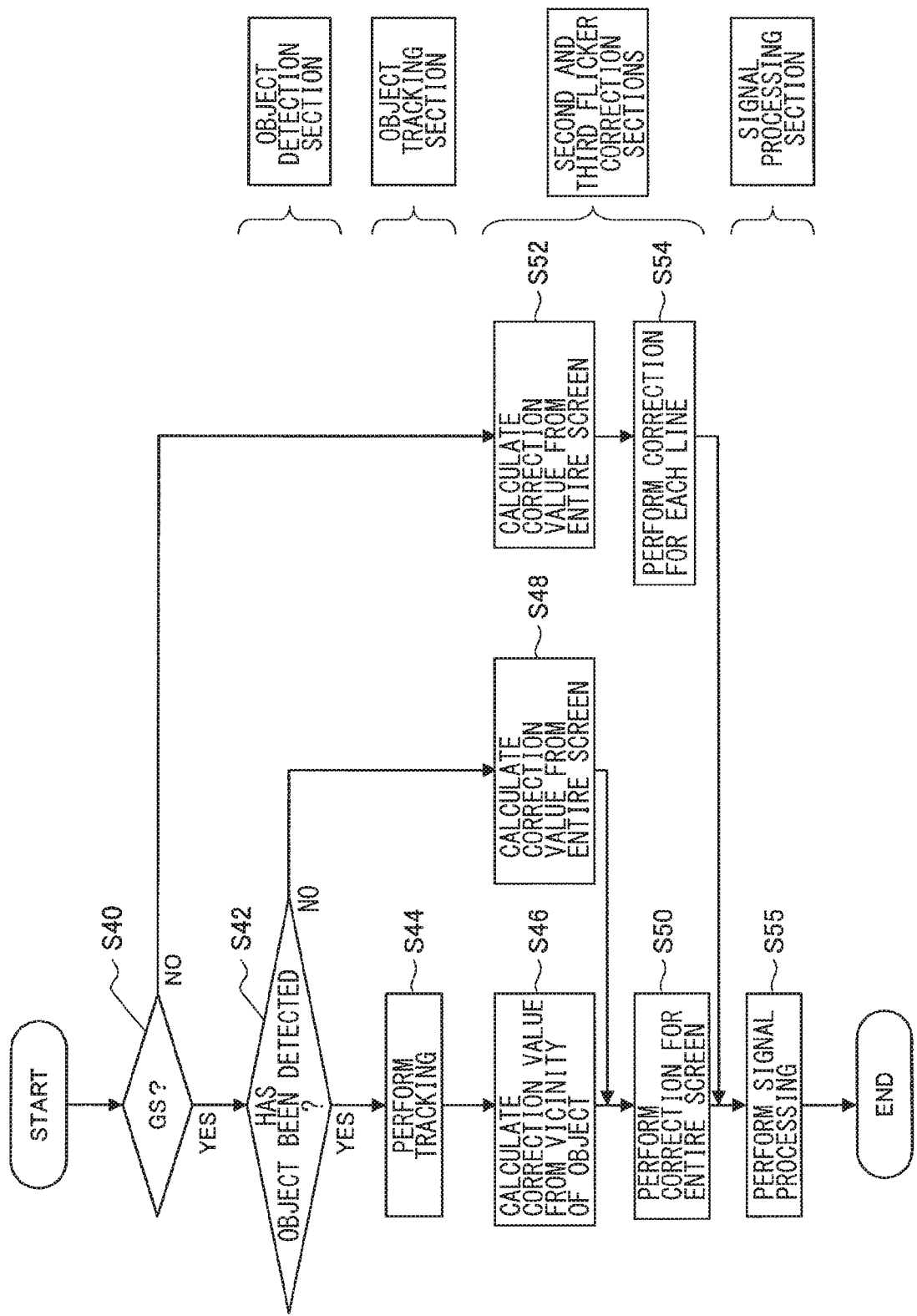
[FIG. 7A]

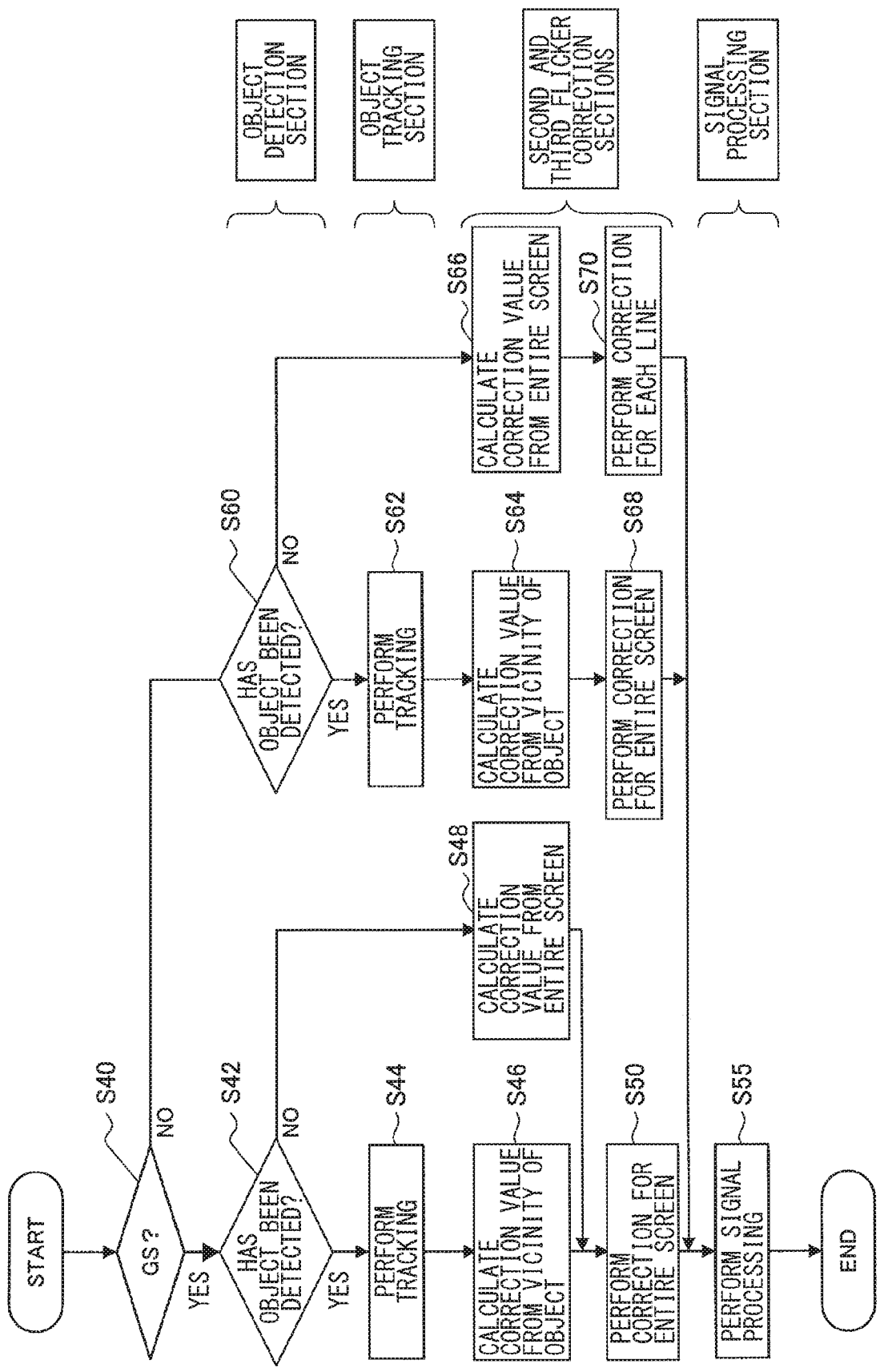
[FIG. 7B]

[FIG. 8]
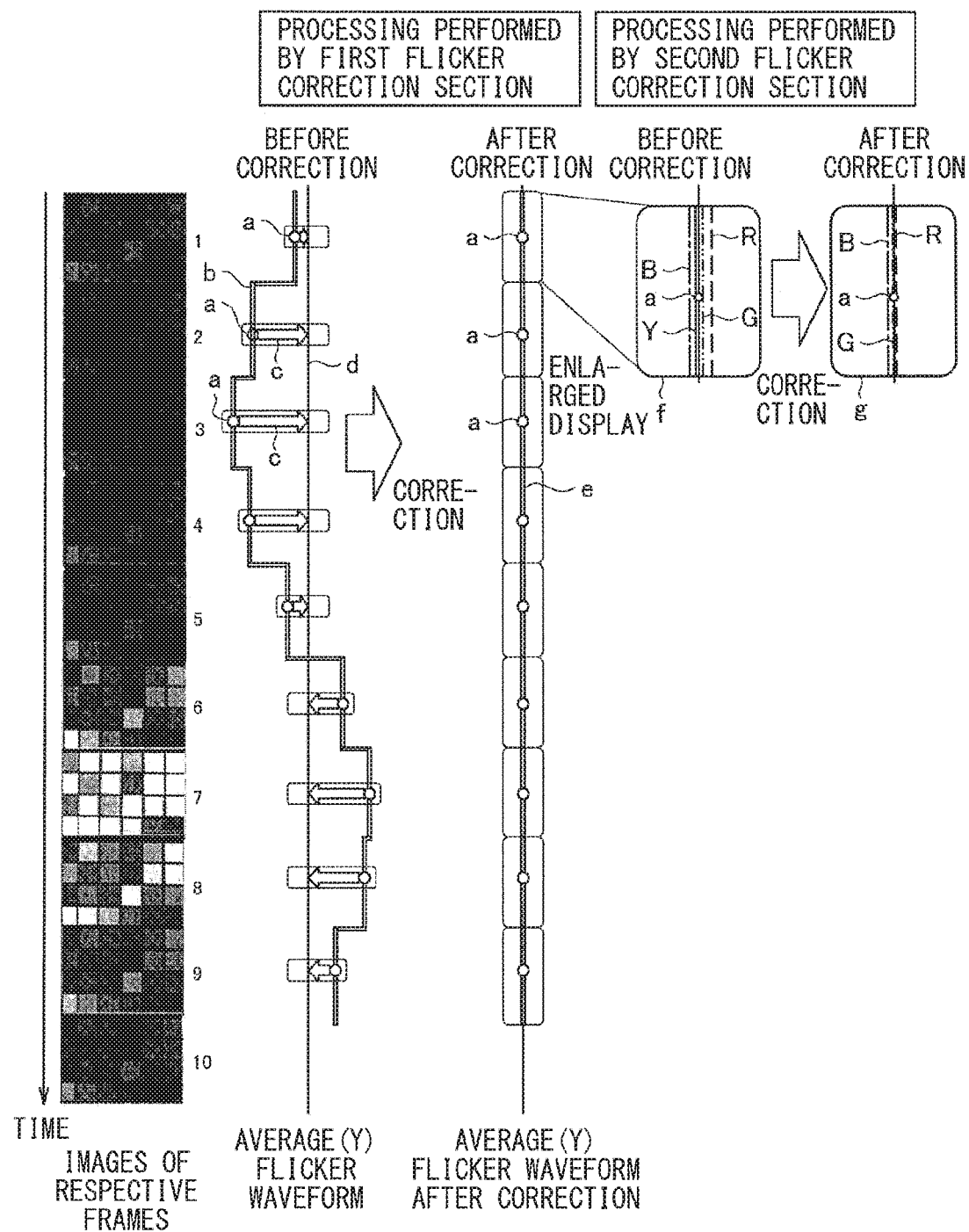

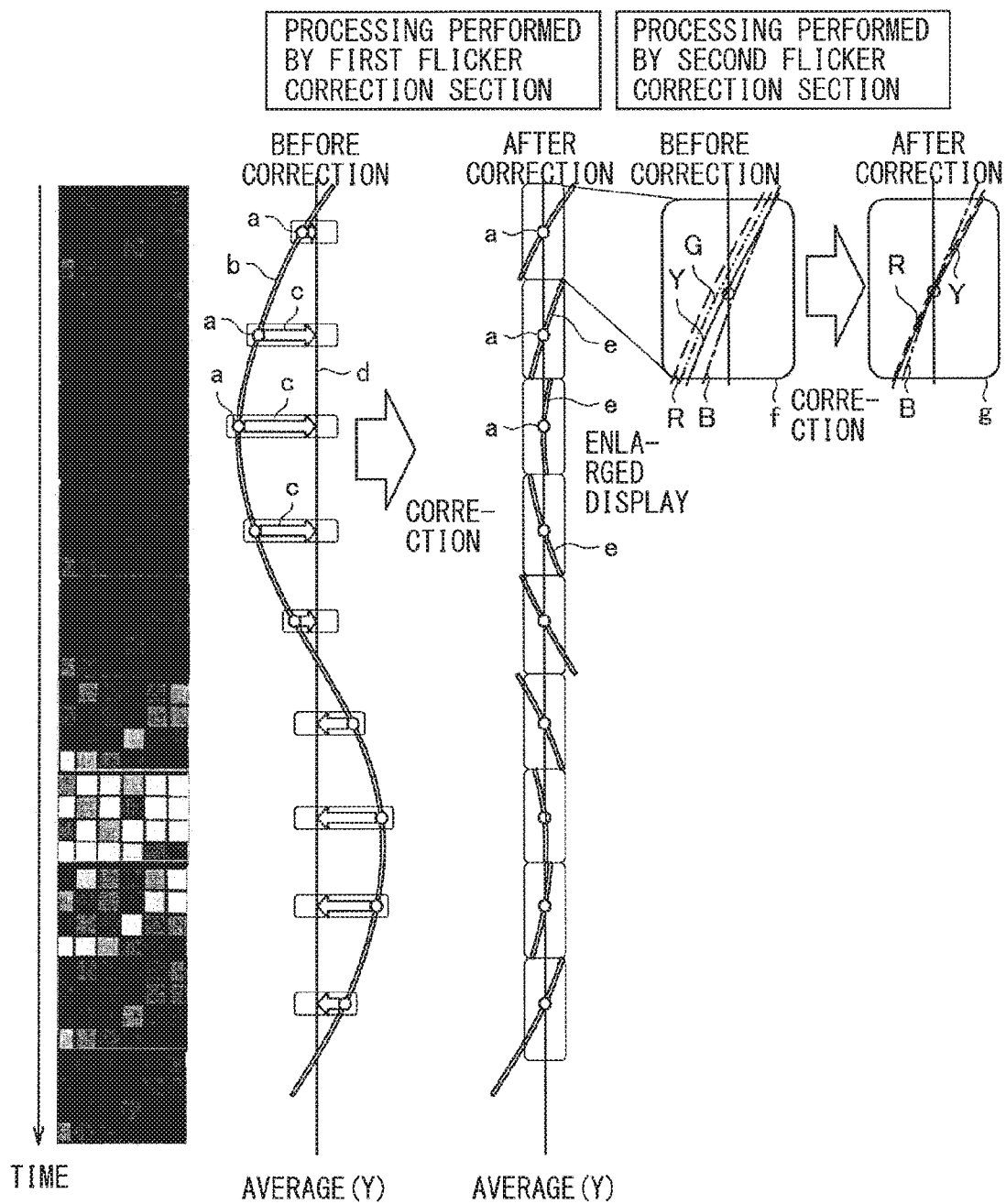
[FIG. 9]

[FIG. 10]
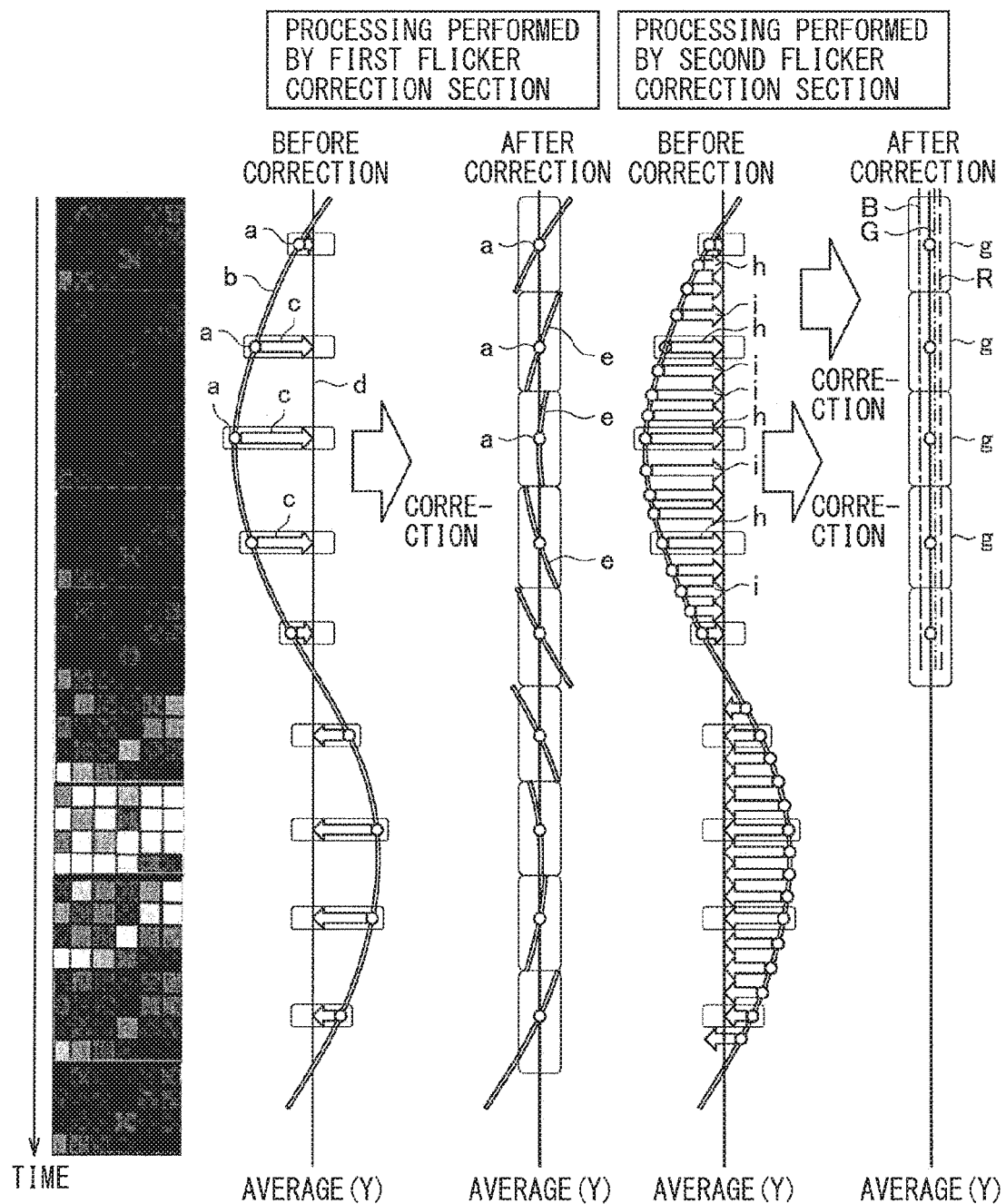

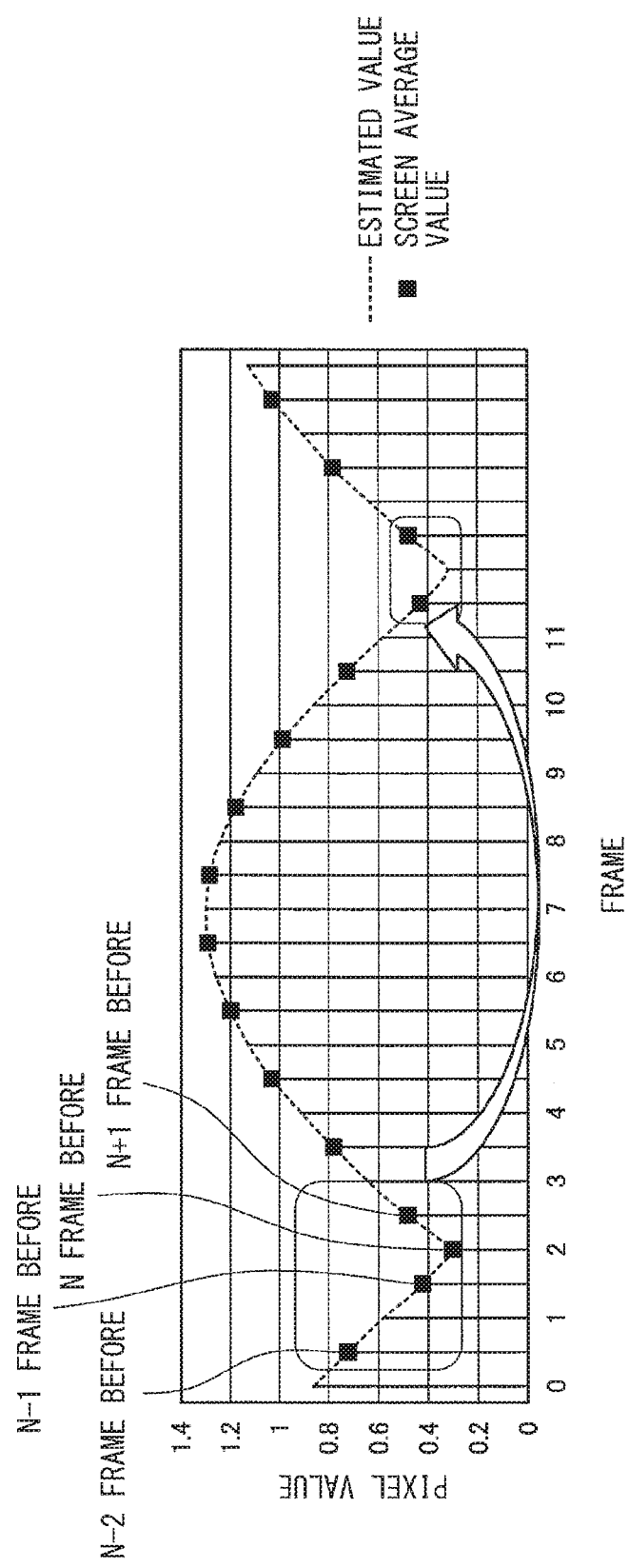
[FIG. 11]

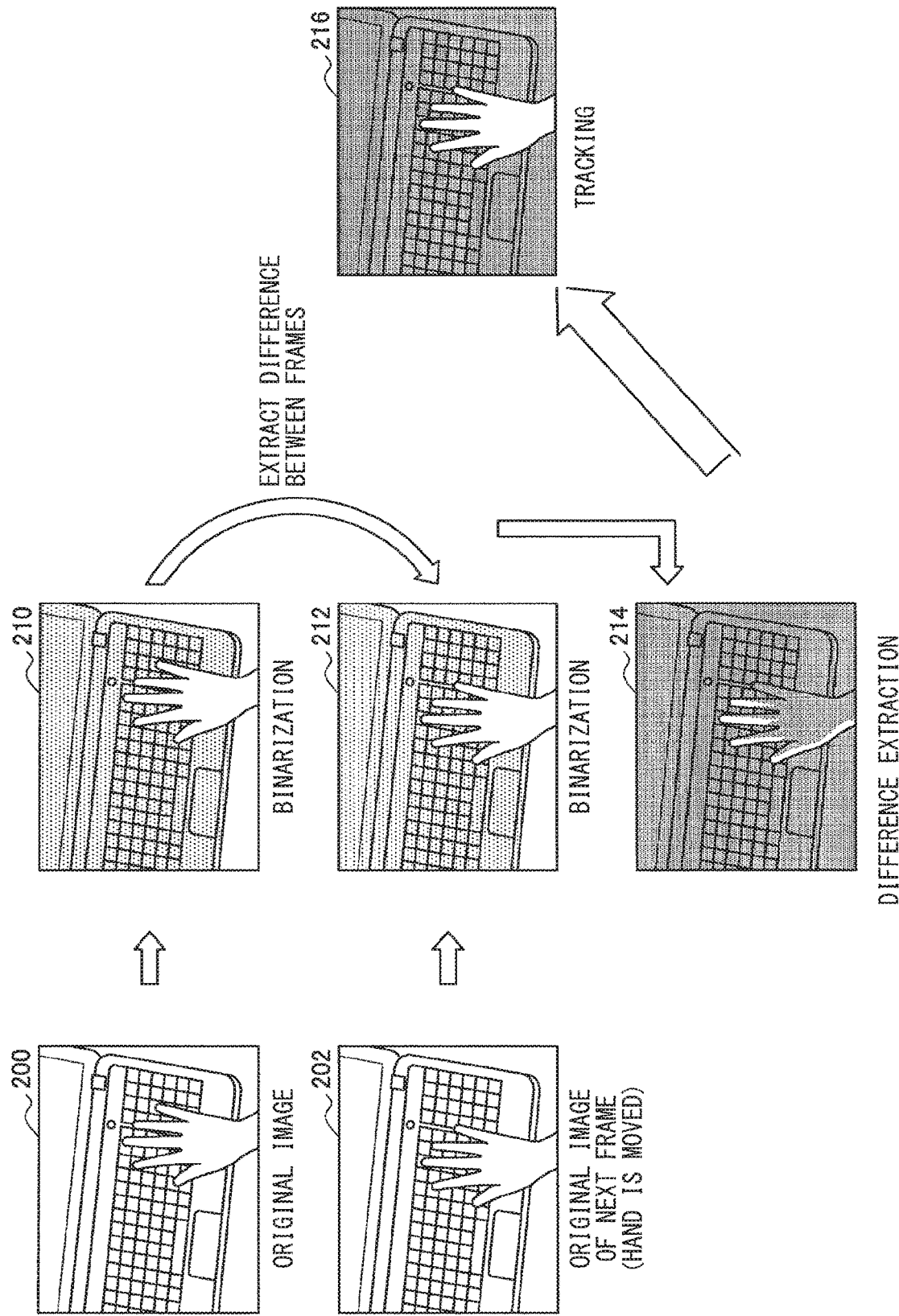
[FIG. 12]

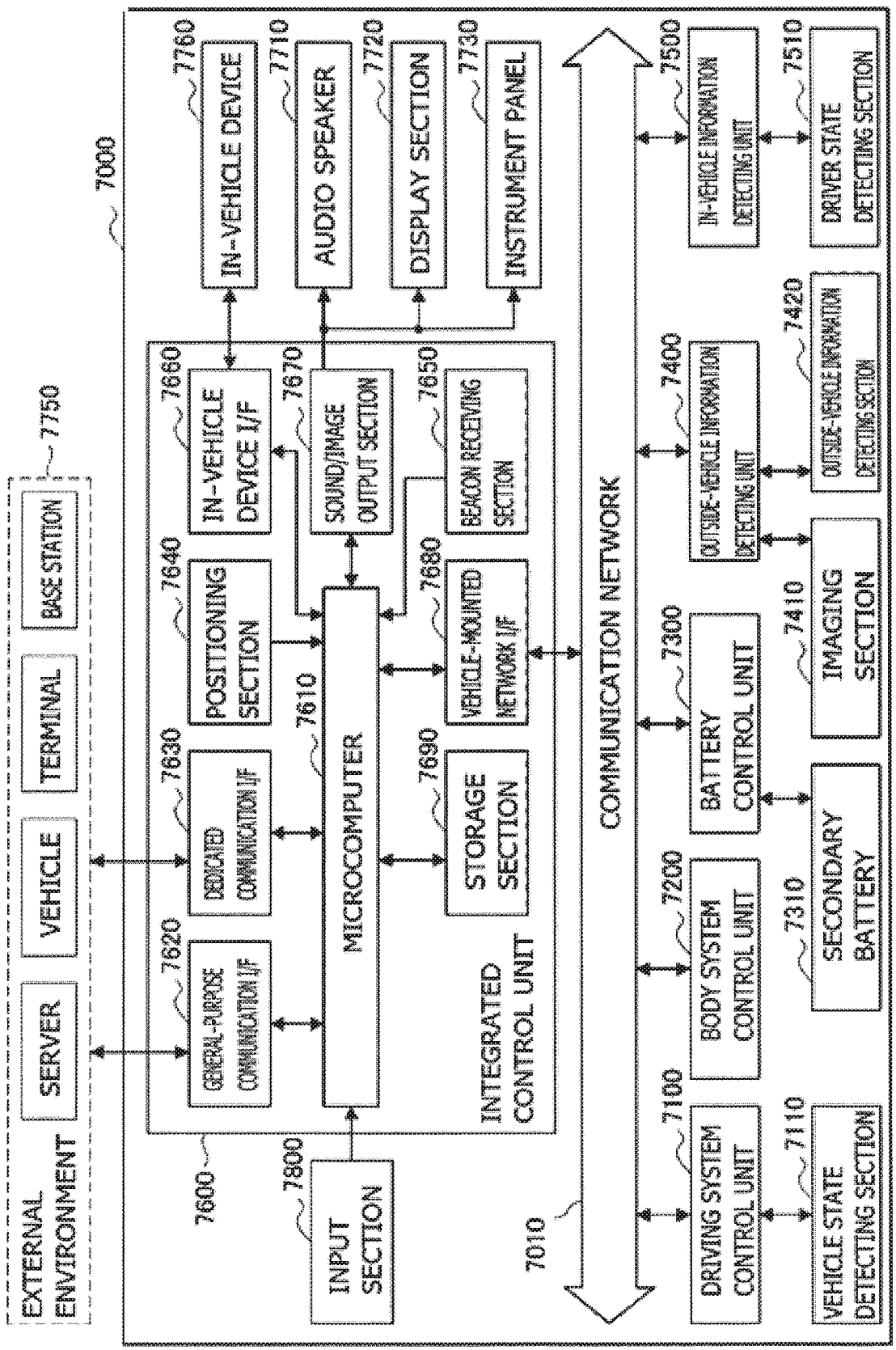
[FIG. 13]

[FIG. 14]
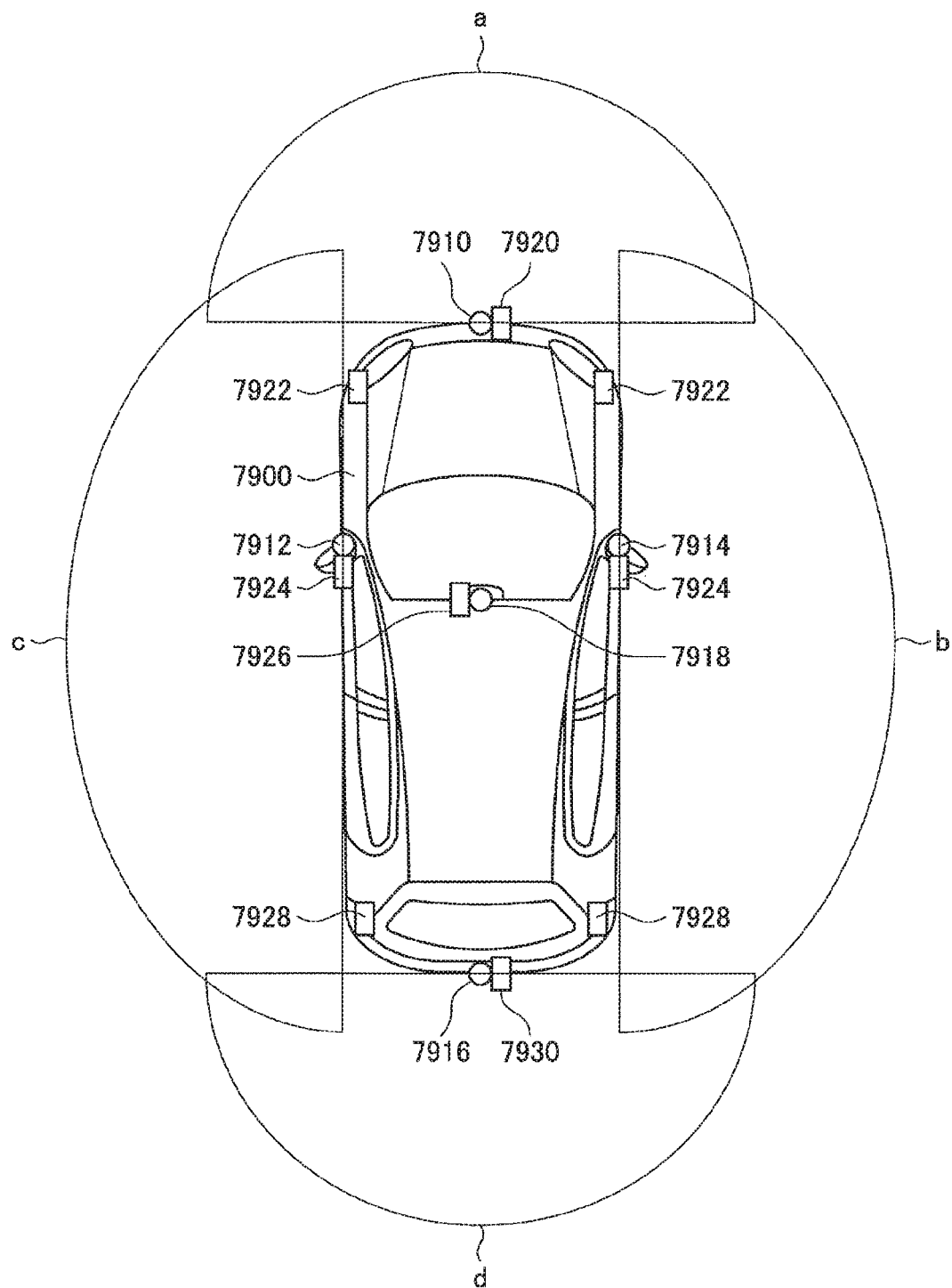

ND IMAGING DEVICE

IMAGE PROCESSOR, IMAGE PROCESSING METHOD, AND IMAGING DEVICE

CROSS REFERENCE TO RELATED APPLICATIONS

This application is a U.S. National Phase of International Patent Application No. PCT/JP2018/039696 filed on Oct. 25, 2018, which claims priority benefit of Japanese Patent Application No. JP 2017-236879 filed in the Japan Patent Office on Dec. 11, 2017. Each of the above-referenced applications is hereby incorporated herein by reference in its entirety.

TECHNICAL FIELD

The present disclosure relates to an image processor, an image processing method, and an imaging device.

BACKGROUND ART

PTL 1 listed below has disclosed, for example, that a correction value for flicker correction is calculated for each of color components of an inputted image, and the flicker correction is performed for each of the color components of the inputted image.

CITATION LIST

Patent Literature

PTL 1: Japanese Unexamined Patent Application Publication No. 2016-82510

SUMMARY OF THE INVENTION

Problem to be Solved by the Invention

However, in the technique described in PTL 1, the correction value is calculated for the input image to perform the correction by means of image processing, and thus modification is performed using a digital gain. Accordingly, there is an issue in which an image with a blown-out highlight or a blocked-up shadow is not able to be corrected due to a large flicker amplitude.

In addition, in a case where a frame rate of imaging is high with respect to a flicker frequency, for example, a shutter period of an imaging element is shorter than a flicker period. Accordingly, it is not possible to perform a method of suppressing a flicker by setting shutter time to an integer multiple of the flicker period.

Accordingly, it has been requested to suppress a flicker in imaging at a high-speed frame rate.

Means for Solving the Problem

According to the present disclosure, there is provided an image processor including: a first correction section that calculates a luminance average value of an image and corrects a luminance of the image on a basis of a periodic change in the luminance average value; and a second correction section that acquires color information on the image and corrects the color information on a basis of a periodic change in the color information.

According to the present disclosure, there is provided an image processing method including: calculating a luminance average value of an image and correcting a luminance of the image on a basis of a periodic change in the luminance average value; and acquiring color information on the image and correcting the color information on a basis of a periodic change in the color information.

According to the present disclosure, there is provided an imaging device including: an imaging element that captures an image of a subject; and an image processor, in which the image processor includes a first correction section that calculates a luminance average value of the image and corrects a luminance of the image on a basis of a periodic change in the luminance average value, and a second correction section that acquires color information on the image and corrects the color information on a basis of a periodic change in the color information.

Effect of the Invention

As described above, according to the present disclosure, it is possible to suppress a flicker in imaging at a high-speed frame rate.

It is to be noted that the above-described effects are not necessarily limitative, and any of the effects set forth in the present specification or other effects that can be grasped from the present specification may be achieved in addition to or in place of the above-described effects.

BRIEF DESCRIPTION OF THE DRAWINGS

FIG. 1A is a schematic view of an imaging device according to an embodiment of the present disclosure.

FIG. 1B is a schematic view of an example in which processing by a first flicker correction section and processing by a second flicker correction section are performed in parallel.

FIG. 2 is a schematic view of an example of using an imaging element in which an analog gain is able to be set for each RGB.

FIG. 3 is a schematic view of an example including, in addition to the configuration of FIG. 1A, an object detection section that is able to detect a target object and an object tracking section that keeps grasping a location of the object in a frame after detecting the object.

FIG. 4 is a schematic view of an example of using an imaging element in which an analog gain is able to be set for each RGB, similarly to FIG. 2.

FIG. 5 is a schematic view of each processing by an exposure amount calculation section, a first flicker correction section, a second flicker correction section, and an exposure amount control section.

FIG. 6 is a flowchart illustrating processing of switching correction methods depending on whether or not the imaging element is a global shutter (GS).

FIG. 7A is a flowchart illustrating a flow of processing in the configuration example illustrated in FIG. 3.

FIG. 7B is a flowchart illustrating a flow of processing in the configuration example illustrated in FIG. 3.

FIG. 8 is a schematic view of flicker correction using an analog gain by the first flicker correction section and the second flicker correction section in a case where the imaging element is the global shutter (GS).

FIG. 9 is a schematic view of flicker correction using an analog gain by the first flicker correction section and the second flicker correction section in a case where the imaging element is a rolling shutter (RS).

FIG. 10 is a schematic view of an example in which an accumulated value for each of R, G, and B in one period of a flicker period is used to complement, using complementary algorithm, a value of a portion for which the accumulated value is not able to be acquired.

FIG. 11 is a schematic view of a method of predicting a correction value i, and is a schematic view of a complementing method at a frame rate of fps and at a light source frequency of Hz.

FIG. 12 is an explanatory schematic view of a method of tracking an object.

FIG. 13 is a block diagram depicting an example of schematic configuration of a vehicle control system.

FIG. 14 is a diagram of assistance in explaining an example of installation positions of an outside-vehicle information detecting section and an imaging section.

MODES FOR CARRYING OUT THE INVENTION

Hereinafter, description is given in detail of preferred embodiments of the present disclosure with reference to the accompanying drawings. It is to be noted that, in the present specification and drawings, repeated description is omitted for components substantially having the same functional configuration by assigning the same reference numerals.

It is to be noted that description is given in the following order.
1. Configuration Example of Imaging Device
2. Details of Flicker Correction
3. Regarding Variation of Present Embodiment
4. Regarding Detection and Tracking of Object
5. Application Example
1. Configuration Example of Imaging Device First, description is given of a configuration of an imaging device 1000 according to an embodiment of the present disclosure, with reference to FIG. 1A. As illustrated in FIG. 1A, the imaging device 1000 includes an imaging element 100, an A/D conversion section 110, an exposure amount calculation section 120, a flicker detection section 130, a first flicker correction section 140, a second flicker correction section 150, a signal processing section 160, and an exposure control section 170.

The imaging element 100 captures an image of a subject at a high-speed frame rate of about 1000 [fps], for example. It is to be noted that, in the present embodiment, the high-speed frame rate refers to, for example, a frame rate having a frequency twice or more the frequency of a flicker phenomenon described later.

The imaging element 100 has a sensor surface on which a plurality of pixels are arranged in matrix, and outputs a captured image constructed by pixel values corresponding to light receiving amounts of pixels arranged in an imaging effective region to be utilized in imaging of an image.

Further, in addition to a pixel used for normal imaging, a pixel specialized in detecting brightness of an imaging environment (also referred to as an OPD (Optical Photo Detector) pixel) may be disposed on the sensor surface of the imaging element 100. The OPD pixel makes it possible to detect an OPD value indicating the brightness of the imaging environment.

Here, for example, in the imaging element 100, red (R), green (G), and blue (B) color filters are arranged in effective pixels in accordance with Bayer arrangement. The OPD pixel is colorless in order to detect brightness. Accordingly, linear interpolation may be performed on pixel values of a plurality of effective pixels having the same colors as colors originally arranged in an arrangement location of the OPD pixel and neighboring the OPD pixel by performing preprocessing on a pixel value of each pixel obtained by the imaging element 100, thus determining a pixel value of a location corresponding to the arrangement position of the OPD pixel.

Image data (pixel value) captured by the imaging element 100 is converted to a digital signal by the A/D conversion section 110, and inputted to the flicker detection section 130. The flicker detection section 130 performs flicker detection. This allows for estimation of a frequency of a flicker light source.

Description is given of estimation of flicker period information by the flicker detection section 130. For example, in the present embodiment, an average value of a luminance of an image is stored for each of a plurality of imaging frames, and discrete Fourier transform (Discrete Fourier Transform: DFT) is used for the stored data to thereby estimate information on a flicker phenomenon of a frequency, a phase, and the like.

Particularly, in a case where an object is irradiated with a flicker light source (e.g., a fluorescent lamp, etc.) that causes a flicker phenomenon, a luminance of the object in the plurality of imaging frames should vary in accordance with a period of the flicker phenomenon. Therefore, in the present embodiment, an average value of luminances of a plurality of pixels corresponding to an image of the object are acquired for respective imaging frames acquired at a predetermined frame rate. Then, application of the DFT (discrete Fourier transform) allows for estimation of a temporal change in a luminance, i.e., a frequency component (frequency, variation in lighting time, lighting interval, etc.) in the temporal change of the luminance.

The imaging frame to be used in estimating period information is acquired at a high-speed frame rate as compared with the period of the flicker phenomenon, thus making it possible to estimate the period information on the flicker phenomenon by application of the DFT.

It is to be noted that, in the present embodiment, the estimation of the period information is not limited to the example described above, and another method may be used. For example, a plurality of imaging frames in a predetermined period of time may be analyzed, and the number of frames from a bright state of the object through a dark state until reaching a bright state again may be counted, to thereby estimate the period information on the flicker phenomenon.

In addition, image data converted to a digital signal by the A/D conversion section 110 is sequentially inputted to the exposure amount calculation section 120, the first flicker correction section 140, and the second flicker correction section 150. FIG. 5 is a schematic view of each processing by the exposure amount calculation section 120, the first flicker correction section 140, the second flicker correction section 150, and the exposure amount control section 170.

The exposure amount calculation section 120 calculates an exposure amount from a detection value and a photometry mode. First, in a detection value acquiring step (step S10), when a screen is divided into n frames, the accumulated value of luminance values and the number of pixels in each of the frames are acquired. In a photometry mode acquiring step (step S12), weights of the respective frames are acquired. Using these values, an evaluation value is determined from the following expression. It is to be noted that the method of determining the evaluation value is not limited to this method; the evaluation value may be determined by another calculation method. When the evaluation value is determined, determination is made, on a basis of a gap between the evaluation value and a target value, of an exposure amount at which the evaluation value converges to the target value.

$$\text{Evaluation Value} = \frac{\sum^{Nframe}(n \text{ frame weight} \times n \text{ frame } OPD \text{ value})}{\sum^{Nframe}(n \text{ frame weight} \times n \text{ frame pixel number})}$$

2. Details of Flicker Correction

The first flicker correction section 140 corrects a flicker amount for the entire screen with respect to the exposure amount calculated in the exposure amount calculation section 120, using the estimated flicker frequency and luminance value information on the flicker period. Specifically, the first flicker correction section 140 corrects an exposure amount to have a correction amount that does not cause a blocked-up shadow or a blown-out highlight on a picture, and notifies the exposure amount control section 170 of the exposure amount, to thereby perform flicker correction using an analog gain.

On the basis of image data captured by the imaging element 100, the exposure amount control section 170 performs an exposure control of the imaging element 100 on the basis of the correction amount calculated in first flicker correction section 10 for the exposure amount calculated by the exposure amount calculation section 120 to have an appropriate exposure amount.

FIG. 5 illustrates each processing by the first flicker correction section 140, the exposure amount control section 170, and the second flicker correction section 150, subsequent to the processing by the exposure amount calculation section 120. The first flicker correction section 140 calculates a corrected exposure amount in consideration of a flicker correction amount for the exposure amount determined in the exposure amount calculation section 120 (step S16). This corrected exposure amount is used to calculate shutter and gain values in the exposure control section 170, and the values are reflected in the imaging element 100 (step S18). This causes the analog value acquired in the imaging element 100 to be corrected, thus making it possible to perform correction using an analog gain. This makes it possible to suppress a blocked-up shadow or a blown-out highlight of an image, unlike correction using a digital gain.

In addition, the second flicker correction section 150 corrects a difference in wavelength characteristics for respective flicker light sources (characteristics for respective R/G/B) by applying digital gain modulations that differ for respective RGB s. The second flicker correction section 150 corrects a difference that has already been corrected by the first flicker correction section 140. Describing a flow of processing on the basis of FIG. 5, the second flicker correction section 150 calculates an exposure amount for flicker correction (step S20). Then, a correction amount obtained by subtracting a correction amount in the first flicker correction section 140 is applied (step S22). An image corrected by the second flicker correction section 150 is subjected to desired signal processing in the signal processing section 160, and is outputted as an image signal.

In the processing by the second flicker correction section 150, the correction method differs depending on whether or not the imaging element 100 is a sensor of a global shutter (GS). FIG. 6 is a flowchart illustrating processing of switching correction methods depending on whether or not the imaging element 100 is the global shutter (GS).

First, in step S30, it is determined whether or not the imaging element 100 is a sensor of the global shutter (GS). In a case where the imaging element 100 is the sensor of the global shutter (GS), the flow proceeds to step S32, where the correction is performed for the entire screen. Meanwhile, the imaging element 100 is not the sensor of the global shutter (GS) but a sensor of a rolling shutter (RS), the flow proceeds to step S34, where the correction is performed for each line. In step S36, signal processing is performed by the signal processing section 160.

FIG. 8 is a schematic view of flicker correction using a digital gain, performed by the first flicker correction section 140 and the second flicker correction section 150 in a case where the imaging element 100 is the global shutter (GS). In the global shutter (GS), pixel values are read simultaneously throughout all pixels. FIG. 8 schematically illustrates, on leftmost side, images of ten frames arranged in a vertical direction in a chronological order. In addition, a flicker waveform and a flicker waveform after correction are illustrated to describe the processing performed in the first flicker correction section 140. In addition, in order to describe the processing performed in the second flicker correction section 150, respective signals of R, G, and B before the correction and respective signals of R, G, and B after the correction are illustrated.

In the first flicker correction section 140, an average value d of a flicker waveform b of the respective frames for one period of a flicker period is set as a target value of the correction. Here, the flicker waveform b illustrates a state in which a pixel value of the OPD pixel changes due to the flicker phenomenon. In a case of the global shutter (GS), the pixel value of the OPD pixel changes for the respective frames.

On the basis of the flicker waveform b one period before the flicker period, the target value (average value d) and an average value a of the flicker waveform b one period before the flicker period of each of the frames are used to determine a correction value c, which is a difference between the average value a and the average value d, for each of the frames. The result of applying the correction value c to the flicker waveform b is a flicker waveform e after the correction illustrated in FIG. 8. The exposure amount control section 170 performs an exposure control on the basis of the correction amount c to thereby cause, in the flicker waveform e after the correction, the average value a before the correction to be moved onto the flicker waveform e. This makes it possible to suppress fluctuation of luminance components due to the flicker phenomenon.

Next, description is given of flicker correction by the second flicker correction section 150. As described above, in the second flicker correction section 150, a correction method is selected depending on whether the imaging element 100 is the global shutter (GS) or the rolling shutter (RS). In FIG. 8, the imaging element 100 is the global shutter (GS), and thus the flicker correction is performed for each RGB for the entire screen.

The processing performed by the second flicker correction section 150 illustrated in FIG. 8 exemplifies only processing performed on the first frame for the convenience of description. A waveform f illustrated in FIG. 8 indicates a relationship between a luminance Y before the correction by the second flicker correction section 150 and pixel values of R, G, and B. The first flicker correction section 140 performs correction using the luminance Y, whereby the average value a before the correction is corrected to the target value for the luminance Y.

Meanwhile, even in a case where the correction is performed by the first flicker correction section 140, there are differences in the phase and the amplitude between a luminance signal Y and R, G, B signals. Specifically, the R signal, the G signal, and the B signal after the correction by the first flicker correction section 140 are each as indicated by the waveform f illustrated in a state before the correction of "Processing Performed by Second Flicker Processing Section" in FIG. 8. It is appreciated, in the waveform f, that a gap occurs with respect to the target value in the middle for each of the R signal, the G signal, and the B signal.

For this reason, the second flicker correction section 150 calculates a correction amount from RGB values in the entire screen for each RGB, and applies the correction amount to the entire screen. The processing in the second flicker correction section 150 is application of the correction method in the first flicker correction section 140 to each of the R, G, and B. For example, in a case of correcting the R signal, pixel values of the R signal are accumulated for the entire screen of one frame, and the accumulated value is averaged for one flicker period, to set the averaged value as the target value. When the correction is performed, the pixel values of the R signal are accumulated for the entire screen of one frame, and a deviation amount from the target value is set as a correction value, to perform correction by multiplying each of the pixel values of the R signal by a digital gain corresponding to the correction value. A correction is performed similarly also for the B signal and the G signal. Application of the digital gain to the entire screen makes it possible, for example, in a case where a subject moves in a portion of a region in the screen, to suppress an influence of the movement on the correction value, thus making it possible to achieve highly robust flicker correction.

At this time, the correction in the first flicker correction section 140 is applied to each of the pixels for each of the R, G, and B, and thus a gap from the remaining target value obtained by subtracting the amount corrected by the first flicker correction section 140 is corrected by the second flicker correction section 150 for each RGB. The result of the correction is as indicated by a waveform g illustrated in "Processing Performed by Second Flicker Processing Section" in FIG. 8. As illustrated in the waveform g, it is appreciated that the R signal, the G signal, and the B signal are corrected to the target value in the middle.

FIG. 9 is a schematic view of flicker correction using an analog gain by the first flicker correction section 140 and the second flicker correction section 150 in a case where the imaging element 100 is the rolling shutter (RS). In a case of the rolling shutter (RS), pixel values are read for each line. In processing illustrated in FIG. 9, the behavior of the flicker waveform b in the frame differs from that in FIG. 8, but the content of the processing is the same as that in FIG. 8.

In the case of the rolling shutter (RS), exposure is sequentially performed for each line in a horizontal direction in images of respective frames of FIG. 9. For this reason, the flicker waveform b for each line in the horizontal direction of the respective frames due to a flicker phenomenon follows the flicker phenomenon and changes in a curved shape.

Then, as illustrated in FIG. 9, the correction amount c is determined from the entire screen of each of the frames, and correction is performed for each line. Similarly to FIG. 8, the average value d for one period of the flicker period is set as the target value of the correction, and the difference between the average value a and the average value d of the flicker waveform b of the respective frames is set as the correction value c. The result of applying the correction value c is the flicker waveform e after the correction illustrated in "Processing Performed by First Flicker Processing Section" illustrated in FIG. 8. The exposure amount control section 170 performs an exposure control on the basis of the correction amount c, to thereby cause, in the flicker waveform e after the correction, the average value a before the correction to be moved onto the flicker waveform e.

In the case of the rolling shutter (RS), the exposure is performed for each line to cause the pixel values to be read, and thus the flicker waveform b is obtained in which a luminance of the flicker phenomenon is reflected for each line of each of the frames. In addition, the correction value c is uniformly applied to each line of each of the frames, and thus the flicker waveform e after the correction of each of the frames has different values for each line.

The second flicker correction section 150 performs processing similar to that in FIG. 8. That is, the remainder obtained by subtracting the amount corrected by the first flicker correction section 140 is corrected by the second flicker correction section 150 for each of the R, G, and B. For example, in a case of correcting the R signal, the pixel values of the R signal are accumulated for the entire screen of one frame, the accumulated value is averaged for one flicker period, to set the averaged value as the target value. Then, the accumulated value of the pixel values of the R signal of a frame to be corrected is determined, and a deviation amount between the target value and the accumulated value of the R signal of the frame to be corrected is set as a digital gain, to correct each of the pixel values of the R signal. The result of the correction is as indicated by the waveform g illustrated in "Processing Performed by Second Flicker Processing Section" in FIG. 9.

In the example illustrated in FIG. 9, in the middle line of each of the frames, the luminance signal Y, the R signal, the G signal, and the B signal each coincide with a central target value. Meanwhile, also in the waveform g after the correction by the second flicker correction section 150, a deviation between each of the R, G, B signals and the target value occurs as being away from the middle line of each of the frames.

Accordingly, as illustrated in FIG. 10, the accumulated value for each of the R, G, and B for one period of the flicker period may be used to perform prediction and correction by complementing, using complementary algorithm, a value of a portion for which the accumulated value is not able to be acquired.

In FIG. 10, the processing by the first flicker correction section 140 is similar to that in FIG. 9. The processing of the second flicker correction section 150 illustrates processing of correction by exemplifying a case of the R signal. In the processing of the second flicker correction section 150, a correction amount h is a value obtained from a deviation amount between the accumulated value of the R signal of each of the frames and the target value. Meanwhile, a correction value i is an estimated value determined by estimation from the correction value h of each of the frames. In a case of shooting at a high-speed frame rate equal to or more than twice the flicker frequency (typically 100 Hz or 120 Hz), satisfying a sampling theorem makes it possible to predict the correction value i from the correction value h.

The second flicker correction section 150 uses the correction value h and the correction value i to further correct pixel values of the R signal, the G signal, and the B signal that have already been corrected in the first flicker correction section 140.

As described above, in the example illustrated in FIG. 10, a correction amount for each line is estimated for each RGB from the RGB values of the entire surface to perform correction for each line.

FIG. 11 is a schematic view of a method of predicting the correction value i, and illustrates, as an example, an interpolation method in a case of a frame rate of 1000 fps and a light source frequency of 100 Hz. In FIG. 11, an average value of pixel values for each of the R, G, and B in the screen for each of the frames (a screen average value plotted by a square in the drawing) is determined. Then, an estimated value indicated by a broken line in FIG. 11 is determined on the basis of the screen average value. Estimation on the basis of the screen average value is able to be performed using, for example, Lagrange interpolation that is common as interpolation processing. As illustrated in FIG. 11, it is appreciated that the estimated value repeatedly increases and decreases periodically in response to the flicker phenomenon.

For example, it is assumed that the screen average value of the respective signals of RGB in the screen up to the tenth frame illustrated in FIG. 11 has already been determined. Assuming that the period of the flicker phenomenon corresponds to approximately N frames, the screen average value of the respective signals of the RGB at the eleventh frame and the twelfth frame is able to be determined from screen average values of N+1 frame before, N frame before, N−1 frame before, and N−2 frame before. In addition, the respective signals of RGB for each line at the eleventh frame and the twelfth frame are able to be estimated from the screen average values of N+1 frame before, N frame before, N−1 frame before, and N−2 frame before.

As described above, the estimation of a flicker waveform of each line using the screen average value of one period before enables a result thereof to be applied to the correction amount of a current frame. It is to be noted that, in a case where it is not possible to use the screen average value of one period before due to a relationship between the frame rate and the light source frequency, an average OPD value of a M period before (M denotes an arbitrary integer) is used.

It is to be noted that, in the case of the rolling shutter (RS), it is not necessary to perform line-by-line correction. Even in the case of the rolling shutter (RS), correction may be performed on a screen-by-screen basis by determining a correction amount for the entire screen without determining a correction amount for each line as illustrated in FIG. 9.

It is to be noted that, the description has been given hereinabove of the case of the Bayer arrangement; however, even in a case of RCCB or RCCG other than the Bayer arrangement, processing is performed separately for a luminance and a color similarly to the case of the Bayer arrangement, thereby making it possible to perform the flicker correction.

3. Regarding Variation of Present Embodiment

FIG. 1B is a schematic view of an example in which the processing performed by the first flicker correction section 140 and the processing performed by the second flicker correction section 150 are performed in parallel. As illustrated in FIG. 1B, the processing by the first flicker correction section 140 and the processing by the second flicker correction section 150 are able to be performed in parallel.

In addition, FIG. 2 is a schematic view of an example of using the imaging element 100 in which an analog gain is able to be set for each RGB. In a case of using the imaging element 100 in which the analog gain is able to be set for each RGB, it is possible to use a flicker correction section 180 provided with both of a function of the first flicker correction section 140 and a function of the second flicker correction section 150, thus making it unnecessary to use the first flicker correction section 140 and the second flicker correction section 150 separately. In this case, an exposure amount is controlled by the exposure control section 170 for each RGB on the basis of the analog gain for each RGB.

FIG. 3 is a schematic view of an example including, in addition to the configuration of FIG. 1A, an object detection section 190 that is able to detect a target object and an object tracking section 200 that keeps grasping a location of the object in a frame after detecting the object. In addition, in the example illustrated in FIG. 3, a third flicker correction section 210 is provided at a subsequent stage of the object tracking section 200. A function of the third flicker correction section 210 is similar to the function of the second flicker correction section 150, but differs from the second flicker correction section 150 in that the third flicker correction section 210 calculates a correction value in a predetermined region including a tracked object. In the example illustrated in FIG. 3, it is possible for the third flicker correction section 210 to calculate a correction amount for each RGB from the vicinity of a focused object and to apply the correction to the entire screen. The calculation of the correction amount for each RGB from the vicinity of the object makes it possible to perform, with high accuracy, the flicker correction in an object to be focused.

FIG. 4 is a schematic view of an example of using the imaging element 100 in which the analog gain is able to be set for each RGB similarly to FIG. 2. In the example illustrated in FIG. 4, the first flicker correction section 140 and the second flicker correction section 150 are not provided, and, similarly to FIG. 2, the flicker correction section 180 is provided that has both of the function of the first flicker correction section 140 and the function of the second flicker correction section 150.

Further, in the example illustrated in FIG. 4, similarly to FIG. 3, the object detection section 190 and the object tracking section 200 are provided, and the third flicker correction section 210 is provided at a subsequent stage of the object tracking section 200. Accordingly, it is possible to calculate a correction amount for each RGB from the vicinity of a focused object and to apply the correction amount to the entire screen.

FIG. 7A is a flow chart illustrating a flow of processing in the configuration example illustrated in FIG. 3. Hereinafter, description is given of the flow of the processing in the configuration example illustrated in FIG. 3 on the basis of FIG. 7A. First, in step S40, it is determined whether or not the imaging element 100 is the global shutter (GS), and the flow proceeds to step S42 in the case of the global shutter (GS). In step S42, it is determined whether or not an object has been detected by the object detection section 190.

In a case where the object is detected in step S42, the flow proceeds to step S44. In step S44, the object is tracked by the object tracking section 200. In the next step S46, the third flicker correction section 210 calculates a correction value for each RGB on the basis of an image in a predetermined region including the object in the screen.

Meanwhile, in a case where no object is detected in step S42, the flow proceeds to step S48. In step S48, the second flicker correction section 140 calculates a correction amount for each RGB from the entire screen.

After steps S46 and S48, the flow proceeds to step S50. In step S50, the flicker correction is performed for the entire screen on the basis of the correction values determined in steps S46 and S48. In the next step S55, the signal processing section performs signal processing. As described above, in the configuration example illustrated in FIG. 3, in a case where the object detection section 190 detects no object, flicker correction by the third flicker correction section 210 is not performed, while flicker correction by the second flicker correction section 140 is performed. In a case where an object is detected from an image after the flicker correction by the second flicker correction section 140, flicker correction in the vicinity of a region of the object is performed by the third flicker correction section 210. The detection of an object from the image after the flicker correction by the second flicker correction section 140 makes it possible to surely detect an object. In addition, in a case where an object is detected from the image after the flicker correction by the second flicker correction section 140, the flicker correction in the vicinity of the region of the object performed by the third flicker correction section 210 makes it possible to perform, with high accuracy, the flicker correction in an object to be focused. When the flicker correction by the third flicker correction section 210 is started, the flicker correction by the second flicker correction section 140 is stopped.

In addition, in a case of not being the global shutter (GS) in step S40, i.e., in the case of the rolling shutter (RS), the flow proceeds to step S52. In step S52, the second flicker correction section 140 calculates a correction value for each RGB from the entire screen; in the next step S54, correction is performed for each line as illustrated in FIG. 10. After steps S50 and S54, the flow proceeds to step S55, where the signal processing section 160 performs signal processing.

The processing of the FIG. 7A illustrates the example in which target detection is not performed in the case of the rolling shutter (RS); however, as illustrated in the FIG. 7B, object detection may be performed in the case of the rolling shutter (RS). In the processing of FIG. 7B, each processing of steps S40, S42, S44, S46, S48, S50, and S55 is performed similarly to FIG. 7A. In a case of being determined, in step S40, to be the rolling shutter (RS), the flow proceeds to step S60. In step S60, it is determined whether or not an object has been detected by the object detection section 190.

In a case where the object has been detected in step S60, the flow proceeds to step S62. In step S62, the object is tracked by the object tracking section 200. In the next step 64, the third flicker correction section 210 calculates a correction value for each RGB on the basis of an image in a predetermined region including the object in the screen. In the next step S68, the flicker correction is performed for the entire screen.

Meanwhile, in a case where no object is detected in step S60, the flow proceeds to step S66. In step S66, the second flicker correction section 150 calculates a correction amount for each RGB from the entire screen. In the next step S70, the flicker correction is performed for each line as illustrated in FIG. 10.

After steps S68 and S70, the flow proceeds to step S55. In step S55, the flicker correction is performed for the entire screen on the basis of the correction values determined in steps S68 and S70. As described above, according to the processing in FIG. 7B, in a case where the imaging element 100 is the rolling shutter (RS), when an object is tracked, the flicker correction is performed for each RGB on the basis of an image in a predetermined region including the object. In addition, in the case where the imaging element 100 is the rolling shutter (RS), when an object is not tracked, the correction amount is calculated for each RGB from the entire screen, and the flicker correction is performed for each line.

4. Regarding Detection and Tracking of Object

FIG. 12 is a schematic view of an example of detection of an object by the object detection section 190. The example illustrated in FIG. 12 exemplifies a method of detecting an object to be tracked from a plurality of imaging frames captured at a high-speed frame rate. FIG. 12 illustrates a human hand as an example of an object. It is assumed that the hand is moving slightly in a narrow region for typing on a keyboard. It is to be noted that, in the present embodiment, the object is not limited to such a human hand.

First, image processing is performed on a captured color imaging frame to generate a grayscaled imaging frame (original images 200 and 202) as illustrated in left side of FIG. 12. Particularly, for example, in a case of generating a grayscaled imaging frame for red (R), pixel values of the red (R) of respective pixels in the color imaging frame are extracted as color information. In this case, in the grayscaled imaging frame, a pixel having a high R pixel value becomes white; in a case of a low R pixel value, a pixel becomes black. With respect to the original image 200, the position of the hand in the original image 202 of the next frame has moved, Then, the R pixel value of each of the pixels of the grayscaled imaging frame is compared with a predetermined threshold value, and, for example, a pixel value of a pixel having a predetermined threshold value or more is converted to one, and a pixel value of a pixel less than the predetermined threshold value is converted to 0. In this manner, it is possible to generate images 210 and 212 of binarized imaging frames as illustrated in the middle of FIG. 12. In the two binarized images 210 and 212 illustrated in the middle of FIG. 12, the pixel value of the hand is converted to one, while the pixel value of the periphery of the hand is converted to zero.

It is to be noted that, in a case of generating a grayscaled image frame, a pixel value of any of red, green, and blue (RGB) may be extracted, or an average value of three pixel values may be used. In addition, after giving weights to the respective pixel values, a value obtained by accumulating the respective pixel values may be used. In addition, when generating the grayscaled imaging frame, it is preferable to select a suitable color and a suitable method depending on features of an object to be detected.

Then, the images 210 and 212 of the two binarized imaging frames illustrated in the middle upper tiers of FIG. 12 are compared, and an image 214 is extracted that is obtained by taking a difference between the imaging frames, to thereby extract a specific region (object) in which a movement has occurred in the image 214. In the image 214, a region in which the hand is moved has a pixel value difference of one, and thus is illustrated in white. Accordingly, in the image 214, the region illustrated in white is detected as the movement of the object (hand). Then, repeating such processing makes it possible to track the object.

It is to be noted that, in the present embodiment, the detection of the object is not limited to the above-described methods; for example, feature points of the object may be stored in advance, and the stored feature points may be extracted from the imaging frame, to thereby perform detection of the object. For example, in this case, when the object is a face of a person, detection of the person is performed on the basis of feature points (eyes, nose, mouth) of the face of the person.

Next, description is given in detail of tracking of an object by the object tracking section 200. As illustrated in an image 216 on right side of FIG. 12, the object tracking section 200 performs tracking (tracking) for the detected object (hand).

For example, a self-window method is used to keep tracking an object in a plurality of successive imaging frames captured at a high-speed frame rate. The self-window method is one type of algorithm for tracking an object in imaging frames captured at a high-speed frame rate. In a case of imaging at a high-speed frame rate, a moving distance (difference) of the object in the plurality of imaging frames is small. Accordingly, in a case where an extraction window for extracting the object is set in a region around the object in a previous imaging frame, the object is included in the extraction window even in the next imaging frame.

More specifically, the extraction window is set as a pixel region that is expanded outward by one pixel with respect to a pixel region indicating the object in the previous imaging frame. In a case where the object is not included in the set extraction window in the next imaging frame rate, the frame rate is further sped up to thereby enable the object to be included in the extraction window. In addition, the moving distance of the object is small, and thus it is possible to decrease an area of the extraction window, which is a range in which the object is searched. Accordingly, performing image matching or the like in the extraction window makes it possible to easily detect the object. In the example of FIG. 12, it is possible to track the object using a skin color for detection of the hand, on the basis of whether or not pixel values of R, G, and B constituting the skin color are present in the extraction window.

It is to be noted that the extraction window has been described as being set as the pixel region that is expanded outward by one pixel with respect to the pixel region indicating the object in the previous imaging frame; however, the present embodiment is not limited to expanding by one pixel. For example, a pixel region expanded by two or more pixels may be set as the extraction window. The number of pixels to be expanded may be appropriately selected depending on, for example, the frame rate, the speed of the object, and the like.

In addition, in a case where the object is not included in the set extraction window in the next imaging frame rate, the frame rate is further sped up, but such a method is not limitative. For example, the number of pixels to be expanded when setting the extraction window may be adjusted to thereby cause the object to be included in the extraction window.

Further, the self-window method involves calculating a logical product between the extraction window calculated from the previous imaging frame and a next binarized object image to thereby generate a target extraction image and to track the object. In addition, according to the self-window method, images of the object between target extraction images of preceding and succeeding imaging frames are compared, thereby making it possible to acquire not only position information and area (shape) information on the object but also information such as a moving direction and a moving speed of the object. As is obvious from the above description, in a case of using the self-window method, it is preferable that the imaging frame for use in tracking the object be captured at a high-speed frame rate.

It is to be noted that, in the present embodiment, the tracking of the object is not limited to the above-described examples, and another method may be used. For example, in the present embodiment, the tracking of the object may be performed on the basis of feature points common to preceding and succeeding imaging frames.

As described above, according to the present embodiment, causing the first flicker correction section 140 to perform the flicker correction makes it possible to suppress occurrence of saturation (a blown-out highlight or a blocked-up shadow) at a time point of analog data acquired by the imaging element 100, and thus to increase S/N. In addition, it is possible to provide a robust flicker correction method even for the movement of the imaging element 100 and for a moving subject.

4. Application Example

The technology according to an embodiment of the present disclosure is applicable to a variety of products. For example, the technology according to an embodiment of the present disclosure may be implemented as a device to be mounted on a mobile body of any kind, such as an automobile, an electric vehicle, a hybrid electric vehicle, a motorcycle, a bicycle, any personal mobility device, an airplane, a drone, a vessel, a robot, a construction machine, and an agricultural machine (tractor).

FIG. 13 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 13, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 13 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 14 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 14 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 13, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 13, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 13 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the vehicle control system 7000 described above, the imaging device 1000, an information processor 100 according to the present embodiment described with reference to FIGS. 1A and 1B, etc. may be applied to the imaging section 7410 of the application example illustrated in FIG. 13.

Although the description has been given above in detail of preferred embodiments of the present disclosure with reference to the accompanying drawings, the technical scope of the present disclosure is not limited to such examples. It is obvious that a person having ordinary skill in the art of the present disclosure may find various alterations or modifications within the scope of the technical idea described in the claims, and it should be understood that these alterations and modifications naturally come under the technical scope of the present disclosure.

In addition, the effects described herein are merely illustrative or exemplary, and are not limitative. That is, the technique according to the present disclosure may achieve, in addition to or in place of the above effects, other effects that are obvious to those skilled in the art from the description of the present specification.

It is to be noted that the technical scope of the present disclosure also includes the following configurations.

(1)

An image processor including:

a first correction section that calculates a luminance average value of an image and corrects a luminance of the image on a basis of a periodic change in the luminance average value; and a second correction section that acquires color information on the image and corrects the color information on a basis of a periodic change in the color information.

(2)

The image processor according to (1), in which the first correction section sets, as a target value, a value obtained by averaging the respective luminance average values in a plurality of frames, and performs correction to cause the luminance of the image to be the target value.

(3)

The image processor according to (2), in which the plurality of frames includes at least one period of a luminance change due to a flicker phenomenon.

(4)

The image processor according to any one of (1) to (3), including an exposure amount control section that controls an exposure amount of the image on a basis of a correction value calculated by the first correction section on the basis of the periodic change in the luminance average value.

(5)

The image processor according to any one of (1) to (4), in which the second correction section performs correction for the image subjected to the correction by the first correction section.

(6)

The image processor according to any one of (1) to (5), in which the second correction section determines respective accumulated values of values of a plurality of pieces of the color information on the image, sets, as a target value, a value obtained by averaging the accumulated values in a plurality of frames, and corrects each of the plurality of pieces of the color information to cause each of the accumulated values to be the target value.

(7)

The image processor according to (6), in which the plurality of frames includes at least one period of a change in the color information due to the flicker phenomenon.

(8)

The image processor according to (6), in which the plurality of pieces of the color information includes the color information of three colors of red, green and blue.

(9)

The image processor according to any one of (1) to (8), in which the second correction section corrects the color information uniformly throughout the image.

(10)

The image processor according to any one of (1) to (8), in which the second correction section performs correction for each line of pixel arrangement of the color information.

(11)

The image processor according to (6), in which the second correction section performs correction on a basis of the accumulated values for an optional line in one frame, and the second correction section performs correction on a basis of an estimated value estimated from the accumulated values for a line other than the optional line.

(12)

The image processor according to any one of (1) to (11), including:

an object detection section that detects an object in the image; and a tracking section that performs tracking of the object, the second correction section correcting the color information in a predetermined region including the object subjected to the tracking.

(13)

An image processing method including:

calculating a luminance average value of an image and correcting a luminance of the image on a basis of a periodic change in the luminance average value; and acquiring color information on the image and correcting the color information on a basis of a periodic change in the color information.

(14)

An imaging device including:

an imaging element that captures an image of a subject; and an image processor, the image processor including a first correction section that calculates a luminance average value of the image and corrects a luminance of the image on a basis of a periodic change in the luminance average value, and a second correction section that acquires color information on the image and corrects the color information on a basis of a periodic change in the color information.

REFERENCE NUMERALS LIST 100 imaging element
140 first flicker correction section
150 second flicker correction section
170 exposure control section
1000 imaging device

The invention claimed is:

1. An image processor, comprising:
a first correction section configured to:
calculate a luminance average value of an image; and
correct a luminance of the image based on a periodic change in the luminance average value; and
a second correction section configured to:
acquire color information of the image;
determine accumulated values for each of a plurality of pieces of the color information of the image;
set, as a target value, a value that is obtained based on average of the accumulated values for one of the plurality of pieces of the color information in a plurality of frames of the image; and
correct each of the plurality of pieces of the color information to cause each of the accumulated values to be the target value.

2. The image processor according to claim 1, wherein the first correction section is further configured to:
set, as the target value, a value that is obtained based on an average of respective luminance average values in the plurality of frames; and
perform correction to cause the luminance of the image to be the target value.

3. The image processor according to claim 2, wherein the plurality of frames includes at least one period of a luminance change due to a flicker phenomenon.

4. The image processor according to claim 1, further comprising an exposure amount control section configured to control an exposure amount of the image based on a correction value calculated by the first correction section, wherein the correction value is calculated based on the periodic change in the luminance average value.

5. The image processor according to claim 1, wherein the second correction section is further configured to perform correction for the image subjected to the correction by the first correction section.

6. The image processor according to claim 1, wherein the plurality of frames includes at least one period of a change in the color information due to a flicker phenomenon.

7. The image processor according to claim 1, wherein the plurality of pieces of the color information comprises the color information of at least one of a red color, a green color, or a blue color.

8. The image processor according to claim 1, wherein the second correction section is further configured to correct the color information uniformly throughout the image.

9. The image processor according to claim 1, wherein the second correction section is further configured to perform correction for each line of pixel arrangement of the color information.

10. The image processor according to claim 1, wherein the second correction section is further configured to:
perform correction based on the accumulated values for an optional line in one frame; and perform correction based on an estimated value estimated from the accumulated values for a line different from the optional line.

11. The image processor according to claim 1, further comprising:
an object detection section configured to detect an object in the image; and
a tracking section configured to track the object, wherein the second correction section is further configured to correct the color information in a region that includes the tracked object.

12. An image processing method, comprising:
calculating a luminance average value of an image;
correcting a luminance of the image based on a periodic change in the luminance average value;
acquiring color information of the image;
determining accumulated values for each of a plurality of pieces of the color information of the image;
setting, as a target value, a value that is obtained based on average of the accumulated values for one of the plurality of pieces of the color information in a plurality of frames of the image; and
correcting each of the plurality of pieces of the color information to cause each of the accumulated values to be the target value.

13. An imaging device, comprising:
an imaging element configured to capture an image of a subject; and
an image processor, wherein the image processor includes:
a first correction section configured to:
calculate a luminance average value of the image; and
correct a luminance of the image based on a periodic change in the luminance average value, and
a second correction section configured to:
acquire color information of the image;
determine accumulated values for each of a plurality of pieces of the color information of the image;
set, as a target value, a value that is obtained based on average of the accumulated values for one of the plurality of pieces of the color information in a plurality of frames of the image; and
correct each of the plurality of pieces of the color information to cause each of the accumulated values to be the target value.

14. The image processor according to claim 1, further comprising:
a third correction section configured to:
calculate a new correction value for each of the plurality of pieces of the color information from a vicinity of an object in the image; and
perform, based on the new correction value, correction of the image subjected to the correction by the first correction section and the second correction section.

* * * * *